(12) United States Patent
Tagawa et al.

(10) Patent No.: US 11,942,313 B2
(45) Date of Patent: Mar. 26, 2024

(54) MASS SPECTROMETER AND MASS SPECTROMETRY METHOD

(71) Applicant: SHIMADZU CORPORATION, Kyoto (JP)

(72) Inventors: Yusuke Tagawa, Kyoto (JP); Yuki Ishikawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 380 days.

(21) Appl. No.: 17/601,456

(22) PCT Filed: May 8, 2019

(86) PCT No.: PCT/JP2019/018334
§ 371 (c)(1),
(2) Date: Oct. 5, 2021

(87) PCT Pub. No.: WO2020/225863
PCT Pub. Date: Nov. 12, 2020

(65) Prior Publication Data
US 2022/0199382 A1   Jun. 23, 2022

(51) Int. Cl.
*H01J 49/00* (2006.01)
*G01N 27/623* (2021.01)
*H01J 49/04* (2006.01)

(52) U.S. Cl.
CPC ........ *H01J 49/0031* (2013.01); *G01N 27/623* (2021.01); *H01J 49/0009* (2013.01); *H01J 49/0431* (2013.01); *H01J 49/0036* (2013.01)

(58) Field of Classification Search
CPC ............... H01J 49/0031; H01J 49/0036; H01J 49/0431; H01J 49/0009; G01N 27/623
See application file for complete search history.

(56) References Cited

U.S. PATENT DOCUMENTS 8,598,522 B2 * 12/2013 Tomany ................ H01J 49/168
                                                        250/288
9,111,736 B2 *  8/2015 Asano ..................... H01J 49/02

FOREIGN PATENT DOCUMENTS

WO    WO-2015118681 A1 *  8/2015   ......... G01N 30/8631

OTHER PUBLICATIONS

Shimadzu Corporation, "LabSolutions Connect MRM", Apr. 18, 2019, 8 pages (Year: 2019).*
(Continued)

*Primary Examiner* — David E Smith
(74) *Attorney, Agent, or Firm* — Sughrue Mion, PLLC

(57) ABSTRACT

A mass spectrometer according to an aspect of the present invention includes, to optimize N (where N is an integer of 2 or more) parameters that affect ionization efficiency in an ion source (31), a measurement controller (41) that causes respective units to repeatedly execute measurement on a sample containing a target component while changing values of the N parameters or a value set of M (where M is an integer smaller than N) parameters, in a plurality of stages, and a parameter determiner (53) that sequentially finds an optimum value for each parameter based on a result of the measurement executed under control of the measurement controller (41). At least one parameter whose physical quantity is temperature is optimized prior to all of the parameters whose physical quantities are other than temperature.

8 Claims, 9 Drawing Sheets

(56) References Cited

OTHER PUBLICATIONS

Shimadzu Corporation, "LabSolutions Connect MRM", Apr. 18, 2019, 9pages.
International Search Report for PCT/JP2019/018334 dated Aug. 13, 2019 [PCT/ISA/210].
Written Opinion for PCT/JP2019/018334 dated Aug. 13, 2019 [PCT/ISA/237].
Notice of Allowance dated Jul. 26, 2022 issued by the Japanese Patent Office in Japanese Application No. 2021-518241.

* cited by examiner

SENSITIVITY MAP IN LOW-TEMPERATURE SET OF TEMPERATURE PARAMETER

SENSITIVITY MAP IN HIGH-TEMPERATURE SET OF TEMPERATURE PARAMETER

Fig. 6A

CHANGE TEMPERATURE PARAMETERS LATER

| ORDER | PARAMETER | SEARCH RANGE | | | | | | THE NUMBER OF SEARCHES |
|---|---|---|---|---|---|---|---|---|
| 1 | I/F VOLTAGE | 150 | 200 | 250 | 300 | 350 | | 5 |
| 2 | NEBULIZING GAS FLOW RATE | 150 | 200 | 250 | | | | 3 |
| 3 | DRY GAS FLOW RATE | 200 | 250 | 300 | 350 | 400 | 450 | 6 |
| 4 | HEATING GAS FLOW RATE | 1 | 1.5 | 2 | 3 | 4 | 5 | 6 |
| 5 | I/F TEMPERATURE | 2 | 2.5 | 3 | | | | 3 |
| 6 | DL TEMPERATURE | 3 | 5 | 8 | | | | 3 |
| 7 | BH TEMPERATURE | 5 | 10 | 14 | 17 | | | 4 |
| | | | | | | | Total | 30 |

Fig. 6B

CHANGE TEMPERATURE PARAMTER FIRST

| ORDER | PARAMETER | SEARCH RANGE | | | | | | THE NUMBER OF SEARCHES |
|---|---|---|---|---|---|---|---|---|
| 1 | I/F TEMPERATURE | 150 | 200 | 250 | 300 | 350 | | 5 |
| 2 | DL TEMPERATURE | 150 | 200 | 250 | | | | 3 |
| 3 | BH TEMPERATURE | 200 | 250 | 300 | 350 | 400 | 450 | 6 |
| 4 | I/F VOLTAGE | 1 | 1.5 | 2 | 3 | 4 | 5 | 6 |
| 5 | NEBULIZING GAS FLOW RATE | 2 | 2.5 | 3 | | | | 3 |
| 6 | DRY GAS FLOW RATE | 3 | 5 | 8 | | | | 3 |
| 7 | HEATING GAS FLOW RATE | 5 | 10 | 14 | 17 | | | 4 |
| | | | | | | | Total | 30 |

Fig. 7

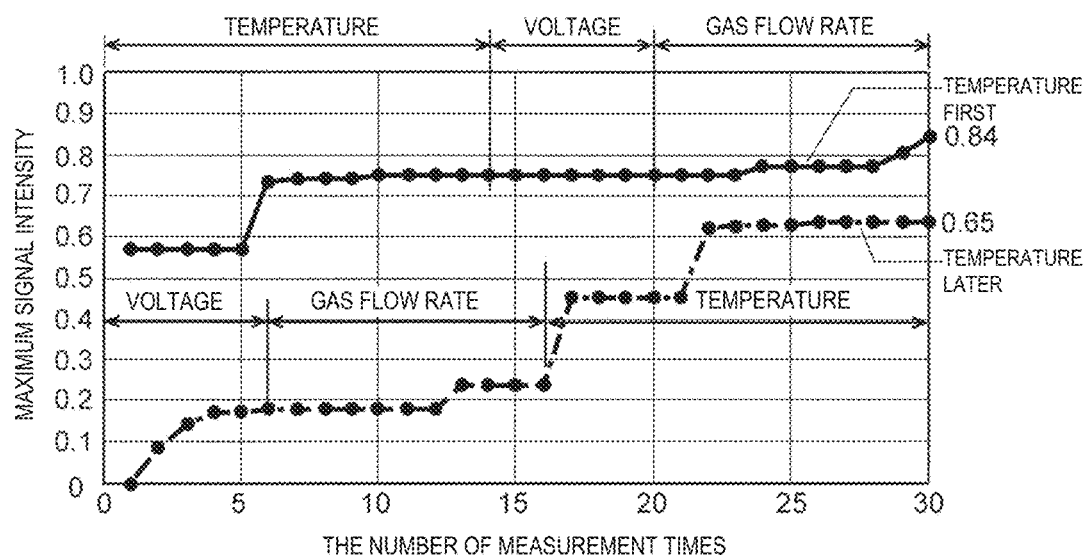

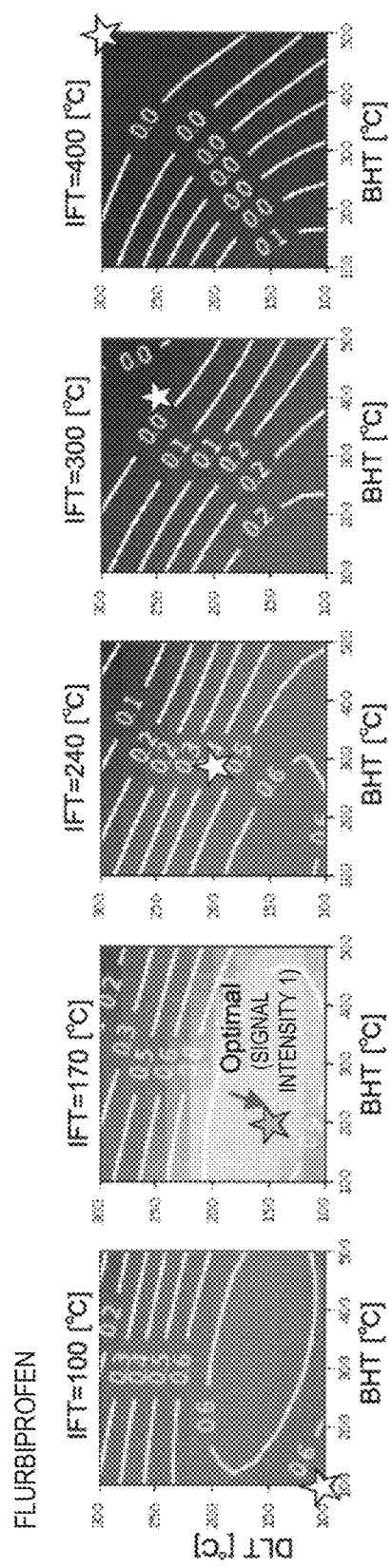

Fig. 9A

TEMPERATURE PARAMETER INDEPENDENT

| ORDER | PARAMETER | SEARCH RANGE | | | | | | THE NUMBER OF SEARCHES |
|---|---|---|---|---|---|---|---|---|
| 1 | I/F TEMPERATURE | 150 | 200 | 250 | 300 | 350 | | 5 |
| 2 | DL TEMPERATURE | 150 | 200 | 250 | | | | 3 |
| 3 | BH TEMPERATURE | 200 | 250 | 300 | 350 | 400 | 450 | 6 |
| 4 | I/F VOLTAGE | 1 | 1.5 | 2 | 3 | 4 | 5 | 6 |
| 5 | NEBULIZING GAS FLOW RATE | 2 | 2.5 | 3 | | | | 3 |
| 6 | DRY GAS FLOW RATE | 3 | 5 | 8 | | | | 3 |
| 7 | HEATING GAS FLOW RATE | 5 | 10 | 14 | 17 | | | 4 |
| | | | | | | | Total | 30 |

Fig. 9B

TEMPERATURE PARAMETER SET

| ORDER | PARAMETER | SEARCH RANGE | | | | | | THE NUMBER OF SEARCHES |
|---|---|---|---|---|---|---|---|---|
| 1 | I/F TEMPERATURE | FIVE SETS: (I/F, DL, BH) = (100,100,100), (170,150,200), (240,200,300), (300,250,400), AND (400,300,500) | | | | | | 5 |
| 2 | DL TEMPERATURE | | | | | | | |
| 3 | BH TEMPERATURE | | | | | | | |
| 4 | I/F VOLTAGE | 1 | 1.5 | 2 | 3 | 4 | 5 | 6 |
| 5 | NEBULIZING GAS FLOW RATE | 2 | 2.5 | 3 | | | | 3 |
| 6 | DRY GAS FLOW RATE | 3 | 5 | 8 | | | | 3 |
| 7 | HEATING GAS FLOW RATE | 5 | 10 | 14 | 17 | | | 4 |
| | | | | | | | Total | 21 |

MASS SPECTROMETER AND MASS SPECTROMETRY METHOD

CROSS REFERENCE TO RELATED APPLICATIONS

This application is a National Stage of International Application No. PCT/JP2019/018334 filed May 8, 2019.

TECHNICAL FIELD

The present invention relates to a mass spectrometer and a mass spectrometry method, and more specifically relates to the mass spectrometer having a function of adjusting device parameters to an optimum state or an approximately optimum state based on an actual measurement result, and the mass spectrometry method.

BACKGROUND ART

The liquid chromatograph mass spectrometer (LC-MS) uses an ion source in order to ionize a compound in a sample liquid eluted from a column of a liquid chromatograph unit. Such an ion source normally uses an atmospheric pressure ionization (API) method such as an electrospray ionization (ESI) method, an atmospheric pressure chemical ionization (APCI) method, or an atmospheric pressure photoionization (APPI) method. For example, in an ESI ion source, an eluate from a column is sprayed into an ionization chamber having an approximately atmospheric pressure atmosphere while a high voltage on the order of kV is applied to a distal end of a capillary to which the eluate is supplied, whereby a biased electric charge is applied to the eluate. Minute charged droplets thus generated are exposed to a high-temperature gas in the ionization chamber, and vaporization of solvent (mobile phase) in the droplets is promoted. In the process of vaporization of the solvent or splitting of the droplets, sample components in the droplets are ionized and taken out into the atmosphere. Ions derived from the sample components thus generated are collected and subjected to mass spectrometry.

In order to perform highly sensitive component analysis in the LC-MS including the ion source as described above, it is important to optimize device parameters, such as a voltage applied to parts of the ion source, temperature of the parts, temperature in the ionization chamber, or flow rates of various gases used for ionization, so that ionization efficiency is as high as possible. Optimum values of the device parameters depend on types of target components (compounds), conditions of the mobile phases (types, flow rates, etc. of the mobile phases), and the like. Therefore, device parameters are generally optimized based on a result obtained by actually measuring a sample (generally, a standard sample) containing a target component while changing the value of each parameter within a predetermined range. When the number of measurement times for optimizing the device parameters is large, the efficiency of measurement decreases, and the amounts of samples and consumed materials such as mobile phases used increases, resulting in an increase in measurement cost. Therefore, it is desired to search for optimum parameter values, that is, optimum measurement conditions with as a fewer number of measurement times.

Here, suppose the number of parameters to be adjusted is N, and the number of values to be changed for one parameter (hereinafter, referred to as "level number") is L. In a case of an attempt to measure round-robin combinations of all parameter values, the number of measurement times becomes $L^N$ (hereinafter, this method is referred to as "exhaustive method"). For example, even if L and N each indicate a several number, the number of measurement times is considerably large. On the other hand, a method for sequentially optimizing values of a plurality of parameters one by one has been known (hereinafter, this method is referred to as a "sequential method"). This sequential method is a method used in "Labsolutions Connect MRM" including an interface parameter optimization function provided by Shimadzu Corporation described in Non Patent Literature 1. In the sequential method, the number of measurement times is L×N, which is much smaller than in the above-described exhaustive method.

CITATION LIST

Non Patent Literature

Non Patent Literature 1: "Lab Solutions Connect MRM", [online], Shimadzu Corporation, [searched on Apr. 18, 2019], Internet

SUMMARY OF THE INVENTION

Technical Problem

In the sequential method, one parameter is optimized while values of the other parameters except for the one among a plurality of parameters are fixed to predetermined values, and such optimization is repeated for all of the plurality of parameters. In this case, parameters with high detection sensitivity are not always obtained in an overall viewpoint even when the optimization of all the parameters is completed. That is, this method has a problem such that a comprehensive optimum solution is not assured, but only a local optimum solution is obtained. In a case where the result of optimizing the device parameters is found to be a local optimum solution, another optimization may be performed. This decreases the measurement efficiency and increases the necessary amount of samples and consumption materials such as mobile phases used, resulting in an increase in the measurement cost. If, on the other hand, the target sample is measured with the local optimum solution, the detection sensitivity is low, resulting in a decrease in analysis accuracy.

The present invention has been made to solve the above problems, and an object of the present invention is to provide a mass spectrometer and mass spectrometry method capable of preventing reaching a local optimum solution when device parameters are optimized by the sequential method and searching for parameters with high detection sensitivity.

Solution to Problem

One aspect of a mass spectrometry method according to the present invention is a mass spectrometry method using a mass spectrometer including an ion source using an atmospheric pressure ionization method for ionizing a component contained in a liquid sample, including, to optimize N parameters that affect ionization efficiency in the ion source, N being an integer of 2 or more:

a measurement execution step of repeatedly executing measurement on a sample containing a target component while changing a value of each of the N parameters or a value set of M parameters among the N parameters in a plurality of stages, M being an integer smaller than N; and a parameter value search step of sequentially finding an optimum value of each of the N parameters or an optimum value set of the M parameters based on a measurement result in the measurement execution step, wherein in the measurement execution step, a value of at least one parameter whose physical quantity is temperature among the N parameters or a value set of the M parameters including the at least one parameter is changed prior to all parameters whose physical quantities are other than temperature among the N parameters, and in the parameter value search step, the at least one parameter whose physical quantity is temperature is optimized prior to all the parameters whose physical quantities are other than temperature.

One aspect of a mass spectrometer according to the present invention is a mass spectrometer including:

an ion source using an atmospheric pressure ionization method for ionizing a component contained in a liquid sample;

a mass separator configured to separate ions derived from the component contained in the liquid sample in accordance with a mass-to-charge ratio;

a detector configured to detect the separated ions;

to optimize N parameters that affect ionization efficiency in the ion source, N being an integer of 2 or more, a measurement controller configured to cause the ion source, the mass separator, and the detector to repeatedly execute measurement on a sample containing a target component while changing a value of each of the N parameters or a value set of M parameters among the N parameters, M being an integer smaller than N, in a plurality of stages; and a parameter determiner configured to sequentially find an optimum value of each of the N parameters or an optimum value set of the M parameters based on a result of the measurement executed under control of the measurement controller, wherein the measurement controller causes measurement to be repeatedly executed while changing a value of at least one parameter whose physical quantity is temperature among the N parameters or a value set of the M parameters including the at least one parameter prior to all parameters whose physical quantities are other than temperature among the N parameters, and the parameter determiner optimizes the at least one parameter whose physical quantity is temperature prior to all the parameters whose physical quantities are other than temperature.

In the one aspect of the mass spectrometry method and the mass spectrometer according to the present invention, the ion source using the atmospheric pressure ionization method for ionizing the component contained in the liquid sample can be typically an ion source using the ESI method, the APCI method, or the APPI method. For example, in the ESI ion source, the parameter whose physical quantity is temperature can include a temperature around a distal end of a spray nozzle (probe) for nebulizing the liquid sample, a temperature of a desolvation tube for sending ions generated in an ionization chamber and charged droplets in which solvents are not completely vaporized to the next stage, and the like.

Advantageous Effects of Invention

In such an atmospheric pressure ion source, the liquid sample is sprayed in an approximately atmospheric pressure atmosphere as fine droplets, and ions derived from sample component are generated in the process of vaporizing the solvents from the droplets. Therefore, the ionization efficiency, that is, the detection sensitivity is easily affected by a temperature, such as a temperature of the region where the liquid sample is sprayed or a temperature of the liquid sample immediately before spraying. It should be noted, however, that it is not always the case where the higher the temperature is, the higher the ionization efficiency is; for some types of components, the detection sensitivity may be higher under a low temperature condition than under a high temperature condition. On the other hand, the optimum condition of temperature for achieving high detection sensitivity is easily affected by other physical quantities such as voltage and gas flow rate. Thus, when a parameter of another physical quantity is optimized prior to the temperature parameter, a local optimum condition that may not be high sensitivity from an overall viewpoint might be reached even if the temperature parameter is optimized later.

On the other hand, according to the mass spectrometry method and the mass spectrometer according to the one aspect of the present invention, at least one temperature parameter is optimized prior to a voltage parameter, a gas flow rate parameter, or the like whose physical quantity is other than temperature. Therefore, the at least one temperature parameter can be prevented from reaching a local optimum condition that may not be high sensitivity from an overall viewpoint, and a value of the parameter that is high sensitivity from an overall viewpoint can be found. Accordingly, unnecessary parameter optimization can be avoided, and measurement efficiency can be improved. The amount of samples and consumption materials such as mobile phases used can be reduced, and this is advantageous to a reduction in the measurement cost.

BRIEF DESCRIPTION OF DRAWINGS

FIG. 6A is a table showing an example of a parameter search condition in device parameter optimization in a case where temperature parameters are optimized later. FIG. 6B is a table showing an example of a parameter search condition in device parameter optimization in a case where the temperature parameters are optimized first.

FIG. 7 is a graph illustrating a relationship between the number of measurement times and maximum signal strength under the parameter search conditions illustrated in FIGS. 6A and 6B.

FIGS. 8A and 8B are diagrams showing sensitivity maps for two different compounds in a case where three temperature parameters are independently optimized.

FIG. 9A is a table showing an example of a parameter search condition in the device parameter optimization in a case where three temperature parameters are optimized independently. FIG. 9B is a table showing an example of a parameter search condition in the device parameter optimization in a case where the three temperature parameters are optimized collectively.

DESCRIPTION OF EMBODIMENTS

A liquid chromatograph mass spectrometer (LC-MS) which is a mass spectrometer according to one embodiment of the present invention will be described with reference to the accompanying drawings.

Overall Configuration of LC-MS According to the Present Embodiment

Figure 1:
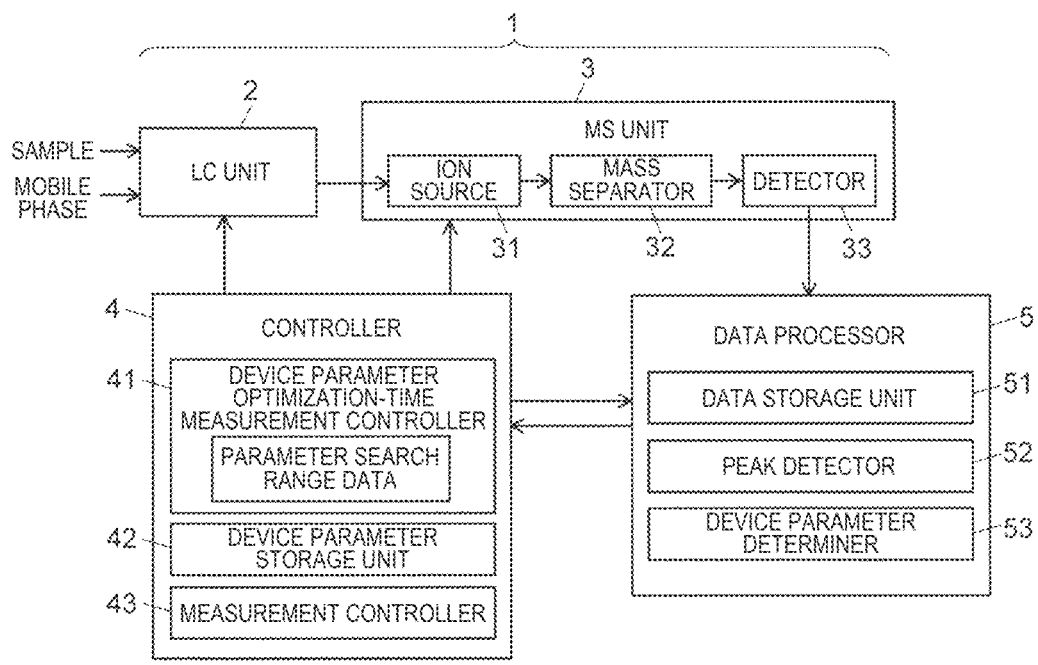
FIG. 1 is a schematic block configuration diagram of a liquid chromatograph mass spectrometer (LC-MS) according to one embodiment of the present invention.

FIG. 1 is a schematic block configuration diagram of an LC-MS according to the present embodiment.

In FIG. 1, a measurement unit 1 includes a liquid chromatograph unit (LC unit) 2 and a mass spectrometry unit (MS unit) 3. The mass spectrometry unit 3 includes an ion source 31, a mass separator 32, and a detector 33. Although not illustrated, the liquid chromatograph unit 2 includes a liquid feeding pump, an injector, a column, and the like. The liquid chromatograph unit 2 injects a predetermined amount of sample from the injector into a mobile phase fed by the liquid feeding pump, and feeds the sample into the column with a flow of the mobile phase. Various components (compounds) in the sample are temporally separated while passing through the column, eluted from a column outlet, and introduced into the mass spectrometry unit 3. In the mass spectrometry unit 3, the ion source 31 ionizes components in the eluate from the column, and the mass separator 32 separates various generated ions in accordance with a mass-to-charge ratio m/z. The detector 33 detects ions separated in accordance with the mass-to-charge ratio and generates a detection signal in accordance with the amount of the ions.

A controller 4 controls an operation of the measurement unit 1, and includes functional blocks such as a device parameter optimization-time measurement controller 41, a device parameter storage unit 42, and a measurement controller 43. The device parameter optimization-time measurement controller 41 has a memory in which parameter search data is stored in advance. A data processor 5 receives data obtained by the measurement unit 1 to perform various types of data processing, and includes functional blocks such as a data storage unit 51, a peak detector 52, and a device parameter determiner 53.

Normally, most of the functional blocks of the controller 4 and the data processor 5 can be embodied by using a personal computer as a hardware resource and by causing the computer to execute dedicated control and processing programs installed in the computer.

Figure 2:
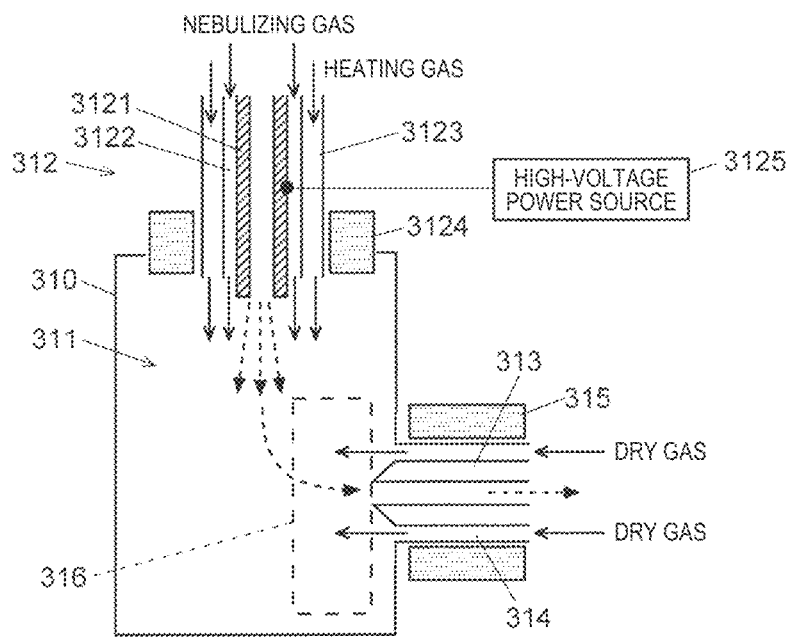
FIG. 2 is a schematic configuration diagram of an ion source in the LC-MS according to the present embodiment.

Configuration and Schematic Operation of Ion Source in LC-MS According to the Present Embodiment FIG. 2 is a schematic configuration diagram of the ion source 31 in the LC-MS according to the present embodiment. The ion source 31 is an electrospray ionization (ESI) ion source that is one of atmospheric pressure ion sources, and includes an ESI probe 312 that ionizes components in the eluate in an ionization chamber 311 in an approximately atmospheric pressure atmosphere formed inside a chamber 310. The ESI probe 312 includes a capillary 3121 through which an eluate flows, a nebulizing gas tube 3122 disposed to surround the capillary 3121, a heating gas tube 3123 disposed to surround the nebulizing gas tube 3122, an interface heater 3124 that heats a distal end of the ESI probe 312, and a high-voltage power source 3125 that applies a high voltage to the capillary 3121. The ionization chamber 311 and an intermediate vacuum chamber (not illustrated) at a next stage communicate with each other through a desolvation tube 313. A dry gas tube 314 for ejecting a dry gas into the ionization chamber 311 is disposed around the desolvation tube 313. A desolvation tube heater 315 heats the desolvation tube 313, the block heater 316 heats an inside of the ionization chamber 311 entirely.

An ion generation operation in the ion source 31 will be briefly described.

When the eluate containing the sample component reaches the vicinity of the distal end of the capillary 3121, a biased charge is applied to the eluate by a DC electric field formed by a high voltage (about several kV at the maximum) applied from the high-voltage power source 3125 to the capillary 3121. The charged eluate is nebulized as fine droplets (charged droplets) into the ionization chamber 311 with the aid of the nebulizing gas ejected from the nebulizing gas tube 3122. The nebulized droplets come into contact with gas molecules in the ionization chamber 311 and are split to be fine. Since the temperature inside the ionization chamber 311 is high, the solvents in the droplets are vaporized. Further, since the heating gas ejected from the heating gas tube 3123 flows to surround a nebulizing flow, the vaporization of the solvents from the droplets is promoted, and the spread of the nebulizing flow decreases. In the process of vaporizing the solvents from the droplets, the component molecules in the droplets have charges and jump out from the droplets to become gas ions.

Since a pressure difference arises between both opening ends of the desolvation tube 313, a gas flow is formed such that the gas in the ionization chamber 311 is sucked into the desolvation tube 313. The charged droplets in which the ions and the solvents derived from the sample component generated from the nebulizing flow from the distal end of the capillary 3121 are not completely vaporized e carried by the gas flow and sucked into the desolvation tube 313. Since the dry gas is ejected from the dry gas tube 314 around an inlet opening of the desolvation tube 313, the solvents from the charged droplets are exposed to the dry gas so as to be further vaporized. Since the desolvation tube 313 is heated to a high temperature by the heater 315, the vaporization of the solvents from the charged droplets also proceeds in the desolvation tube 313. As a result, ions derived from the sample component are efficiently generated and sent to the intermediate vacuum chamber at the next stage.

As for the ion source 31, device parameters that mainly affect ionization efficiency include the following seven parameters.

(1) Interface Temperature (Hereinafter, Occasionally Abbreviated as "IFT" or "I/F Temperature")

This is a temperature around the distal end of the ESI probe 312 which is mainly heated by the interface heater 3124, and the temperature ranges from 100° C. to 400° C.

(2) Block Heater Temperature (Hereinafter, Occasionally Abbreviated as "BHT" or "BH Temperature")

This is a temperature around the inlet of the desolvation tube 313 (an outlet of the dry gas tube 314) which is mainly heated by the block heater 316, and the temperature ranges from 50° C. to 500° C.

(3) Desolvation Tube Temperature (Hereinafter, Occasionally Abbreviated as "DLT" or "DL Temperature")

This is a temperature of the desolvation tube 313 which is mainly heated by the desolvation tube heater 315, and the temperature ranges from 50° C. to 300° C.

(4) Interface Voltage (Hereinafter, Occasionally Abbreviated as "IFV" or "I/F Voltage")

This is a high voltage for ion generation applied to the distal end of the ESI probe 312 (that is, the capillary 3121), and the voltage ranges from 1 kV to 5 kV (where, its polarity depends on an ionization mode, and may be either positive or negative).

(5) Nebulizing Gas Flow Rate (Hereinafter, Occasionally Abbreviated as "Nebgas")

This is a flow rate of the nebulizing gas flowing around the ejection port at the distal end of the ESI probe 312 through the nebulizing gas tube 3122, and the flow rate ranges from 0 L/min to 3.0 L/min.

(6) Heating Gas Flow Rate (Hereinafter, Occasionally Abbreviated as "Heatgas")

This is a flow rate of the high-temperature gas flowing from the periphery of the capillary 3121 through the heating gas tube 3123 in the same direction as the nebulizing flow of the droplets, and the flow rate ranges from 0 L/min to 20 L/min.

(7) Dry Gas Flow Rate (Hereinafter, Occasionally Abbreviated as "Drygas")

This is a flow rate of the dry gas flowing through the dry gas tube 314 in the direction opposite to the gas suction direction into the desolvation tube 313, and the flow rate ranges from 0 L/min to 20 L/min.

Parameters (1), (2), and (3) describe above are parameters in which the physical quantity is temperature (hereinafter, occasionally referred to as "temperature parameters"), parameter (4) is a parameter in which the physical quantity is voltage (hereinafter, occasionally referred to as "voltage parameter"), and parameters (5), (6), and (7) are parameters in which the physical quantity is gas flow rate (hereinafter, occasionally referred to as "gas flow rate parameters").

When the values of the seven parameters are changed, ionization efficiency changes, the amount of ions subjected to mass spectrometry changes, and detection sensitivity (signal strength) in the detector 33 also changes. Since the degree of change in detection sensitivity and the direction of change depend on the component (compound), the parameter values for each compound needs to be optimized in order to perform highly sensitive measurement.

Figure 3:
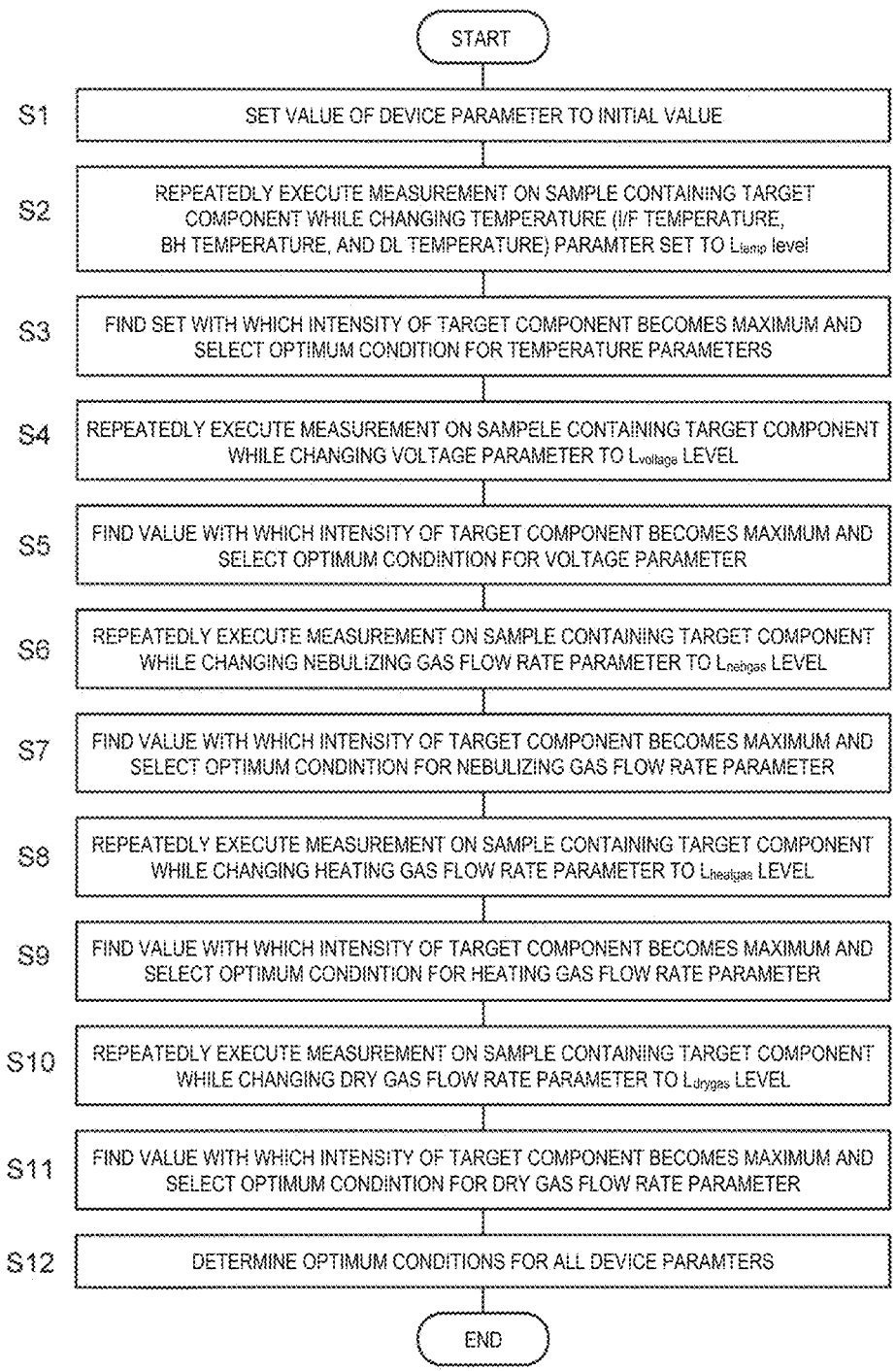
FIG. 3 is a flowchart illustrating a process for optimizing a device parameter of the ion source in the LC-MS according to the present embodiment.

Next, a method of optimizing the device parameters in the LC-MS and a procedure of the method according to the present embodiment will be described. FIG. 3 is a flowchart illustrating the procedure for optimizing the device parameters.

The device parameter optimization-time measurement controller 41 temporarily sets all the parameter values to initial values (step S1). As the initial values, default values are selected such that detection sensitivity is generally high for various compounds.

The device parameter optimization-time measurement controller 41 then sequentially changes only the temperature parameters to $L_{temp}$ levels ($L_{temp}$ stages) including a low-temperature set to a high-temperature set in which the above-described three temperature parameters (I/F temperature, BH temperature, and DL temperature) are set according to the initial condition, and causes the measurement unit 1 to execute LC/MS analysis on the sample containing a target compound at each level (step S2). A specific example of the temperatures will be described later.

Data obtained by the measurement unit 1 is temporarily stored in the data storage unit 51. The peak detector 52 creates a chromatogram (total ion chromatogram or extracted ion chromatogram) for each device parameter including different temperature sets based on the obtained data. Then, a peak corresponding to the target compound is detected, and a peak area value is calculated. Since the peak area value reflects the detection sensitivity, the device parameter determiner 53 compares the peak area values obtained under different temperature conditions, finds a temperature set providing the largest peak area value, and selects the parameter values of the set as the optimum condition of the temperature parameters (step S3).

Thereafter, the device parameter optimization-time measurement controller 41 sets the temperature parameters of the initial condition to the optimum condition, sequentially changes each interface voltage parameter to the $L_{voltage}$ level, and controls the measurement unit 1 to perform the LC/MS analysis on the sample containing a target compound at each level (step S4).

Data obtained by the measurement unit 1 is temporarily stored in the data storage unit 51, and similarly to step S3, the peak detector 52 creates a chromatogram based on the obtained data. Then, a peak corresponding to the target compound is detected, and a peak area value is calculated. The device parameter determiner 53 compares the peak area values obtained under different voltage conditions, finds a voltage value providing the largest peak area value, and selects the found voltage value as the optimum condition of the interface voltage (step S5).

The device parameter optimization-time measurement controller 41 sets the interface voltage of the initial condition to the optimum condition, sequentially changes the nebulizing gas flow rate parameter to the $L_{nebgas}$ level, and controls the measurement unit 1 to perform the LC/MS analysis on the sample containing the target compound at each level (step S6).

Data obtained by the measurement unit 1 is temporarily stored in the data storage unit 51, and similarly to step S3, the peak detector 52 creates a chromatogram based on the obtained data. Then, a peak corresponding to the target compound is detected, and a peak area value is calculated. The device parameter determiner 53 compares peak area values obtained under different nebulizing gas flow rate conditions, finds a gas flow rate value providing the largest peak area value, and selects the found gas flow rate value as the optimum condition of the nebulizing gas flow rate (step S7).

The device parameter optimization-time measurement controller 41 sets the nebulizing gas flow rate of the initial condition to the optimum condition, sequentially changes the heating gas flow rate parameter to the $L_{heatgas}$ level, and controls the measurement unit 1 to perform LC/MS analysis on the sample containing the target compound at each level (step S8).

Data obtained by the measurement unit 1 is temporarily stored in the data storage unit 51, and similarly to step S3, the peak detector 52 creates a chromatogram based on the obtained data. Then, a peak corresponding to the target compound is detected, and a peak area value is calculated. The device parameter determiner 53 compares peak area values obtained under different heating gas flow rate conditions, finds a gas flow rate value providing the largest peak area value, and selects the found gas flow rate value as the optimum condition of the heating gas flow rate (step S9).

The device parameter optimization-time measurement controller 41 sets the heating gas flow rate of the initial condition to the optimum condition, sequentially changes each dry flow rate parameter to the $L_{drygas}$ level, and controls the measurement unit 1 to perform the LC/MS analysis on the sample containing the target compound at each level (step S10).

Data obtained by the measurement unit 1 is temporarily stored in the data storage unit 51, and similarly to step S3, the peak detector 52 creates a chromatogram based on the obtained data. Then, a peak corresponding to the target compound is detected, and a peak area value is calculated. The device parameter determiner 53 compares peak area values obtained under different dry gas flow rate conditions, finds a gas flow rate value providing the largest peak area value, and selects the found gas flow rate value as the optimum condition of the dry gas flow rate (step S11).

As described above, the seven parameters including the set of three temperature parameters are sequentially optimized, and a finally selected value is determined as the optimum value of each parameter (step S12).

As described above, in the LC-MS according to the present embodiment, the temperature parameters are optimized prior to the voltage parameter and the gas flow rate parameters when the device parameters are optimized. Further, the three temperature parameters are optimized not independently but collectively. Regarding these points, experiments conducted to confirm the effects and results of the experiment will be described.

[Effect of Prior Optimization of Temperature Parameters]

An effect of optimizing the temperature parameters prior to the voltage parameter and the gas flow rate parameters will be specifically described.

Figure 4:
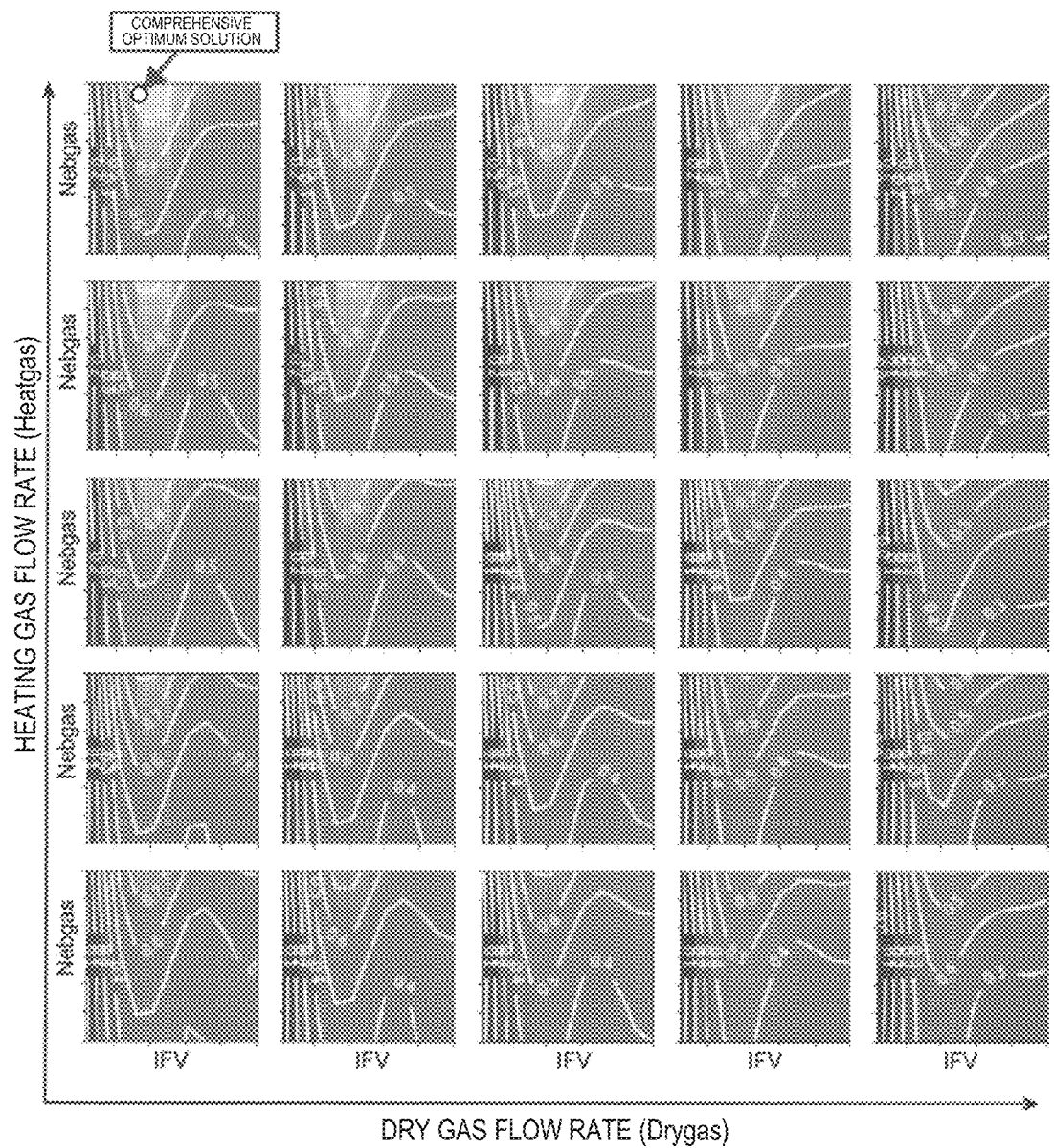
FIG. 4 is a diagram illustrating a sensitivity map based on an actual measurement result in a low-temperature set of temperature parameters in the LC-MS according to the present embodiment.
Figure 5:
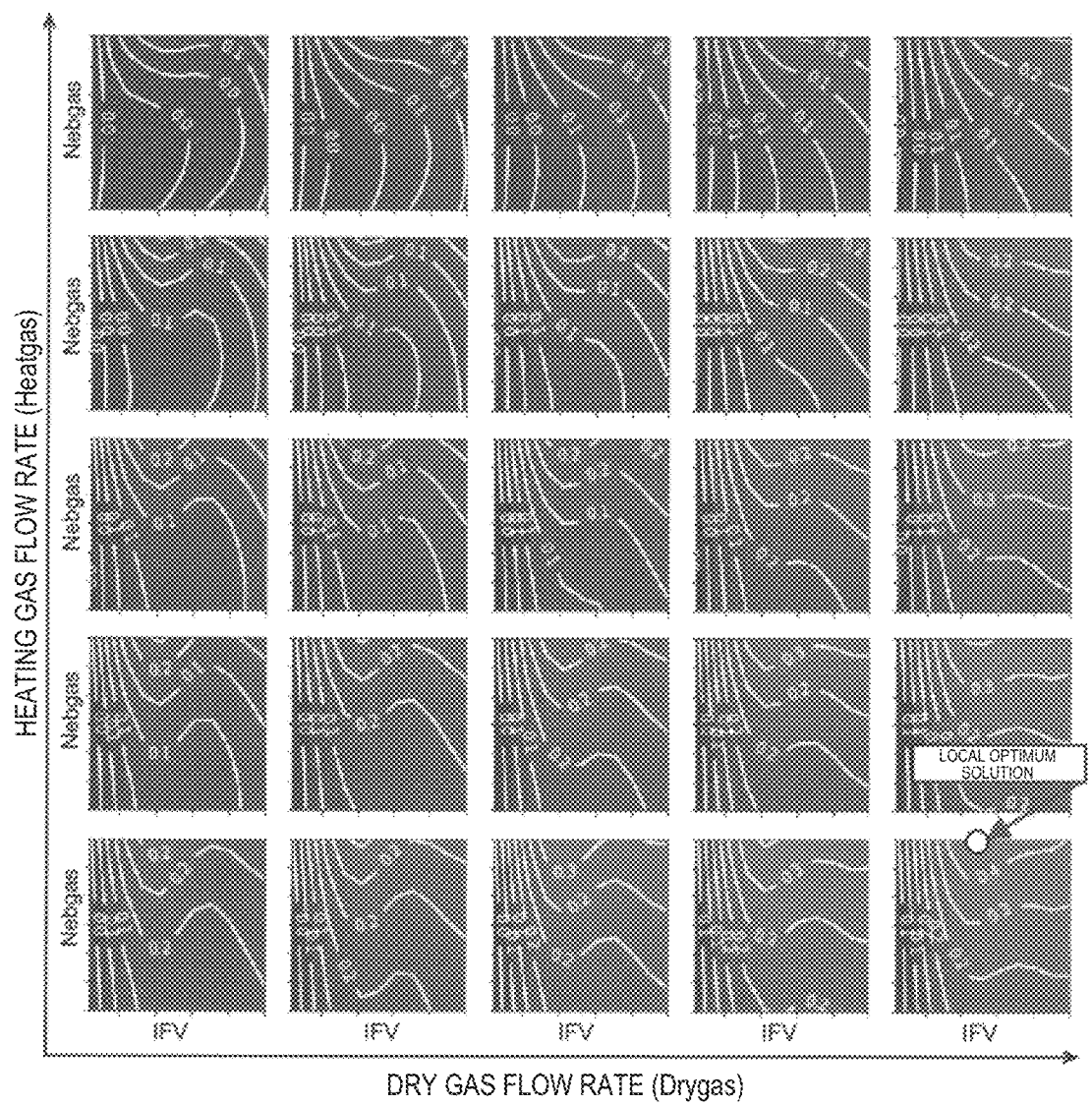
FIG. 5 is a diagram illustrating a sensitivity map based on an actual measurement result in a high-temperature set of the temperature parameters in the LC-MS according to the present embodiment.

FIGS. 4 and 5 are sensitivity maps illustrating distributions of detection sensitivities with respect to three gas flow rate parameters (Nebgas, Heatgas, and Drygas) and a voltage parameter (IFV). FIG. 4 illustrates the case of the low-temperature set in which the temperature parameter values are generally low, and FIG. 5 illustrates the case of the high-temperature set in which the temperature parameter values are generally high. In FIGS. 4 and 5, the horizontal axis of one graph (map) is the I/F voltage, the vertical axis is Nebgas, the horizontal axis of the graph matrix is Drygas, and the vertical axis is Heatgas. This example is prepared by actual measurement for dicamba which is a type of herbicide.

In the ion source 31, generally, the ionization efficiency tends to be higher when the desolvation from the charged droplets in the nebulizing flow is promoted. Therefore, default values of the temperature parameters (that is, the initial values in step S1 in FIG. 3) are set to relatively high temperatures. However, some compounds show high sensitivity under low-temperature conditions, and dicamba is one of them. When FIG. 4 is compared with FIG. 5, it is found that FIG. 4 in which the temperature parameters are the low-temperature set generally has a higher sensitivity. That is, in dicamba, under the conditions of the same gas flow rate and voltage, the lower the temperature, the higher the detection sensitivity gets.

A point at which the detection sensitivity is maximized in the sensitivity maps illustrated in FIGS. 4 and 5, that is, an optimum solution is indicated by a circle. From FIGS. 4 and 5, it can be seen that the optimum conditions of the gas flow rates and the voltage are completely different depending on the temperature conditions. This is because the temperature parameters have a great influence on the detection sensitivity, and the optimum values of other parameters such as the gas flow rates and the voltage tend to change greatly depending on the temperature conditions. When the optimum solution in FIG. 4 is compared with the optimum solution in FIG. 5, the detection sensitivity at the optimum solution in FIG. 4 is considerably higher. Therefore, it is found that the optimum solution in FIG. 5 is merely a local optimum solution that is not the optimum solution among the all device parameters including the temperature parameters. On the other hand, the optimum solution in FIG. 4 is a comprehensive optimum solution among all the device parameters including the temperature parameters.

In a case where the target compound is a compound having a higher sensitivity under the low-temperature condition than under the high-temperature condition like dicamba, a local optimum solution is achieved as illustrated in FIG. 5 when the gas flow rate parameters and the voltage parameter are optimized prior to the temperature parameters under the high-temperature condition. As a result, the gas flow rate parameters and the voltage parameter are determined. Thus, even if the temperature parameters are optimized thereafter, the comprehensive optimum solution illustrated in FIG. 4 cannot be achieved. That is, it is found that the postponement of optimization of the temperature parameters is disadvantageous to finding the comprehensive optimum solution. On the other hand, the LC-MS according to the present embodiment have an effect such that the conditions of higher sensitivity are easily achieved because the temperature parameters having great influence on the detection sensitivity are optimized prior to the gas flow rate parameters and the voltage parameter.

In order to confirm the effect of previously optimizing the temperature parameters, the device parameters are optimized under the two search conditions illustrated in FIGS. 6B and 6B, and the maximum signal strength for each measurement in the optimization process is compared. As is clear from FIG. 6, the values of the respective levels are identical among the seven parameters, and differ only in whether the three temperature parameters are optimized before the other parameters or after the other parameters. However, even if the actual measurement is simply performed under the two search conditions illustrated in FIGS. 6A and 6B and the signal strength is tried to be compared, correct comparison cannot be performed due to the influences of a temporal change in the signal strength and an observation noise. Therefore, a large amount of data is collected in advance by performing actual measurement while changing the condition of the combination of the device parameters, and the parameters are optimized in accordance with the above two search conditions on the computer for a signal strength model constructed based on the large amount of data.

FIG. 7 is a graph illustrating a change in maximum signal strength in the process of device parameter optimization. In a case where the temperature parameters are optimized earlier, eventually, that is, as a result of searching (measurement) at 30 times, the maximum signal strength is 0.84 (relative value). Meanwhile, in a case where the temperature parameters are optimized later, eventually, the maximum signal strength is only 0.65. From this result, it can be experimentally confirmed that conditions of higher detection sensitivity can be achieved by optimizing the temperature parameters in advance.

[Effect of Collectively Optimizing a Plurality of Temperature Parameters]

Figure 8A:
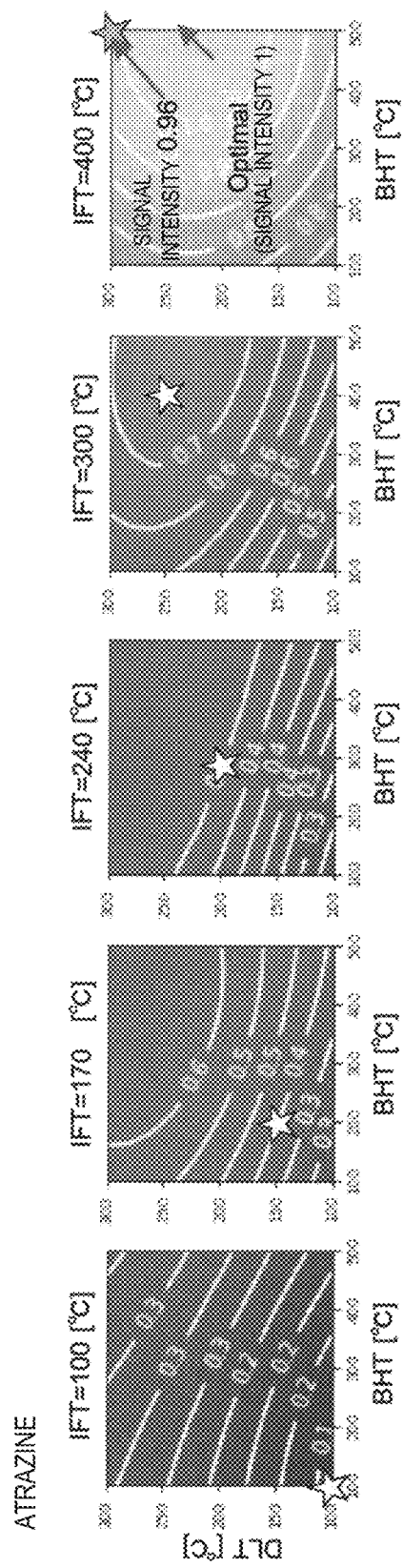

First, validity of collectively optimizing a plurality (three in the above embodiment) of temperature parameters will be described with reference to FIGS. 8A and 8B. FIGS. 8A and 8B are sensitivity maps illustrating distributions of signal strength obtained while actually measuring atrazine and flurbiprofen by independently changing three temperature parameters. The horizontal axis of one graph (map) is the BH temperature, the vertical axis is the DL temperature, and the horizontal axis of the plurality of graphs is the I/F temperature. The other parameters are set to the high sensitivity conditions confirmed in advance.

As an example of the temperature parameter set, five sets variously including a low-temperature parameter to a high-temperature parameter are indicated by star marks in FIGS. 8A and 8B. The star marks with arrows indicate temperature conditions under which the detection sensitivity is maximized in each compound. As is clear from FIGS. 8A and 8B, although the optimum temperature conditions are different between atrazine and flurbiprofen, it can be confirmed that a correlation is established between the rise and fall of all three temperature parameters and the signal strength in any compound. From this result, sufficiently high sensitivity can be achieved even if three temperature parameters are optimized collectively as one set.

In order to confirm the effect of optimization of the three temperature parameters as a set, the device parameters are optimized under two search conditions illustrated in FIGS. 9A and 9B, and maximum signal strength for each measurement in the process of the optimization is compared. The five sets of temperature parameters illustrated in FIG. 9B are identical to those indicated by the star marks in FIGS. 8A and 8B. As is clear from FIGS. 9A and 9B, the values of the respective levels are identical in the seven parameters, and a difference is only whether the three temperature parameters are used as the set. However, also in this experiment, as in the confirmation experiment of the effect of previously optimizing the temperature parameters, the parameters are optimized in accordance with the above two search conditions on the computer for the signal strength model constructed based on a large amount of data collected in advance.

Figure 10A:
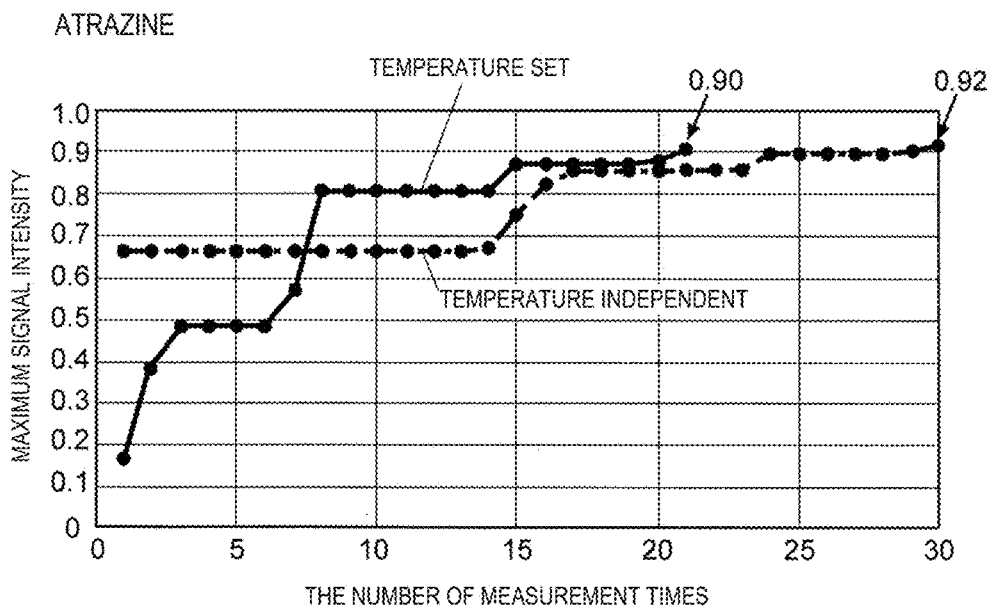
FIGS. 10A and 10B are graphs each illustrating a relationship between the number of measurement and the maximum signal strength for two different types of compounds under the parameter search condition shown in FIGS. 8A and 8B.
Figure 10B:
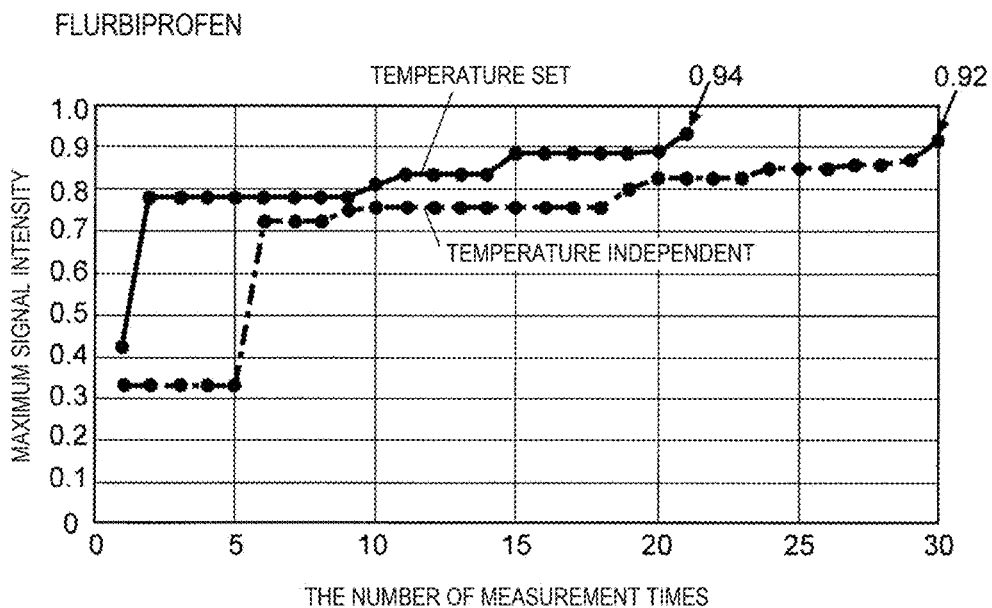

FIGS. 10A and 10B are graphs illustrating a change in the maximum signal strength in the process of the device parameter optimization. In any compound, it can be confirmed that the signal strength equivalent to that in the case of searching while independently changing the temperature parameters can be achieved with a smaller number of measurement times (in this example, 30 times is reduced to 21 times) by making a search while changing the temperature parameter set. In the case of flurbiprofen illustrated in FIG. 10B, although a search space is narrowed by arranging the temperature parameters into the set, the signal strength finally achieved is also improved. This is presumably because the optimization of the temperature parameters is reduced from three stages to one stage, thereby reducing the search under an erroneous condition in which a measured value is large but a true value is small due to the influence of an observation noise.

[Modifications]

The LC-MS according to the above embodiment can be variously modified. Obviously, the numerical values of the device parameters described above are merely examples. The device parameters can be changed appropriately. When an optimum condition is selected in the processing of steps S2 to S11 in FIG. 3, a regression model may be calculated based on the actual measurement data and an optimum condition in the regression model may be selected instead of simply selecting a condition in which the signal strength is maximum from the actual measurement data.

In the LC-MS according to the above embodiment, all of the three temperature parameters which are arranged into the set are optimized before the voltage parameter and the gas flow rate parameters. However, in a case where the three temperature parameters are optimized independently, one temperature parameter that has the greatest influence on the ionization efficiency may be optimized prior to the voltage parameter and the gas flow rate parameters. The set may not include all of the three temperature parameters, but the set may include two temperature parameters, and the other one temperature parameter may be optimized separately from the set.

The LC-MS according to the above embodiment uses the ESI ion source as the ion source, but may be a mass spectrometer using an ion source in another ionization method, such as an atmospheric pressure chemical ionization (APCI) method, an atmospheric pressure photoionization (APPI) method, a probe electrospray ionization (PESI) method, or an ionization method in a real-time direct analysis (DART) method. The mass spectrometer is not limited to a single type mass spectrometer such as a quadrupole mass spectrometer. Thus, the present invention can be naturally applied to a triple quadrupole mass spectrometer, a quadrupole-time-of-flight mass spectrometer, an ion trap time-of-flight mass spectrometer, and the like.

The above-described embodiment and modifications are merely examples of the present invention, and obviously, modifications, corrections, additions, and the like appropriately made within the scope of the gist of the present invention are included in the claims of the present application.

[Various Aspects]

It is easily understood by those skilled in the art that the above-described exemplary embodiments and modifications of the exemplary embodiments are specific examples of the following aspects.

A mass spectrometry method of a first aspect is a mass spectrometry method using a mass spectrometer including an ion source using an atmospheric pressure ionization method for ionizing a component contained in a liquid sample, including, to optimize N parameters that affect ionization efficiency in the ion source, N being an integer of 2 or more:

a measurement execution step of repeatedly executing measurement on a sample containing a target component while changing a value of each of the N parameters or a value set of M parameters among the N parameters, in a plurality of stages, M being an integer smaller than N; and a parameter value search step of sequentially finding an optimum value of each of the N parameters or an optimum value set of the M parameters based on a measurement result in the measurement execution step, wherein in the measurement execution step, a value of at least one parameter whose physical quantity is temperature among the N parameters or a value set of the M parameters including the at least one parameter is changed prior to all parameters whose physical quantities are other than temperature among the N parameters, and in the parameter value search step, the at least one parameter whose physical quantity is temperature is optimized prior to all the parameters whose physical quantities are other than temperature.

A mass spectrometer including:

an ion source using an atmospheric pressure ionization method for ionizing a component contained in a liquid sample;

a mass separator configured to separate ions derived from the component contained in the liquid sample in accordance with a mass-to-charge ratio;

a detector configured to detect the separated ions;

to optimize N parameters that affect ionization efficiency in the ion source, N being an integer of 2 or more, a measurement controller configured to cause the ion source, the mass separator, and the detector to repeatedly execute measurement on a sample containing a target component while changing a value of each of the N parameters or a value set of M parameters among the N parameters, M being an integer smaller than N, in a plurality of stages; and a parameter determiner configured to sequentially find an optimum value of each of the N parameters or an optimum value set of the M parameters based on a result of the measurement executed under control of the measurement controller, wherein the measurement controller causes measurement to be repeatedly executed while changing a value of at least one parameter whose physical quantity is temperature among the N parameters or a value set of the M parameters including the at least one parameter prior to all parameters whose physical quantities are other than temperature among the N parameters, and the parameter determiner optimizes the at least one parameter whose physical quantity is temperature prior to all the parameters whose physical quantities are other than temperature.

According to the mass spectrometry method and the mass spectrometer of the first aspect, the at least one temperature parameter is optimized prior to a voltage parameter, a gas flow rate parameter, or the like whose physical quantity is other than temperature. Therefore, the at least one temperature parameter can be prevented from reaching a local optimum condition that may not be high sensitivity from an overall viewpoint, and a value of the parameter that is high sensitivity from an overall viewpoint can be found. Accordingly, unnecessary parameter optimization can be avoided, and measurement efficiency can be improved. The amount of samples and consumption materials such as mobile phases used can be reduced, and this is advantageous to a reduction in the measurement cost.

A mass spectrometry method and a mass spectrometer of a second aspect can be configured so that, in the mass spectrometry method and the mass spectrometer of the first aspect, all the parameters whose physical quantities are temperatures among the N parameters are optimized prior to all the parameters whose physical quantities are other than temperature.

According to the mass spectrometry method and the mass spectrometer of the second aspect, all the temperature parameters are optimized prior to the voltage parameter, the gas flow rate parameter, and the like, and thus, values of the parameters that indicate higher sensitivity from an overall viewpoint can be found.

A mass spectrometry method and a mass spectrometer of a third aspect, can be configured so that, in the mass spectrometry method and the mass spectrometer of the first aspect, the N parameters include parameters whose physical quantities are temperature, voltage, and gas flow rate.

A mass spectrometry method and a mass spectrometer of a fourth aspect can be configured so that, in the mass spectrometry method and the mass spectrometer of the first aspect, in the measurement execution step, when a value of a parameter whose physical quantity is temperature is changed, the value is monotonously changed within a predetermined range.

The meaning of "monotonously change" is a monotonous increase or monotonous decrease. Unlike the voltage and the gas flow rate, the temperature takes time to be stabilized to a changed value. On the other hand, according to the mass spectrometry method and the mass spectrometer of the fourth aspect, when the temperature parameters are changed, the temperatures are monotonously changed without being raised or lowered. Thus, the time required for changing the temperatures can be shortened, and the time required for optimizing the device parameters can also be shortened.

A mass spectrometry method and a mass spectrometer of a fifth aspect can be configured so that, in the mass spectrometry method and the mass spectrometer of the fourth aspect, in the measurement execution step, a value of a parameter whose physical quantity is temperature can be monotonously increased when the value is changed.

In general, when the temperature is changed, the temperature rise using a heater is faster than the temperature drop through cooling using release or a cooling element. Therefore, according to the mass spectrometry method and the mass spectrometer of the fifth aspect, the time required for changing the temperature can be further shortened, and the time required for optimizing the device parameters can also be shortened.

A mass spectrometry method and a mass spectrometer of a sixth aspect, can be configured so that, in the mass spectrometry method and the mass spectrometer of any one of the first to fifth aspects, two or more parameters whose physical quantities are temperatures can be collectively optimized as a parameter set.

A mass spectrometry method and a mass spectrometer of a seventh aspect can be configured so that, in the mass spectrometry method and the mass spectrometer of the sixth aspect, all the parameters whose physical quantities are temperature among the N parameters can be arranged into a parameter set.

According to the mass spectrometry method and the mass spectrometer of the sixth and seventh aspects, a plurality of parameters whose physical quantities are temperatures are collectively optimized as a set. Thus, a condition of high detection sensitivity can be found with a small number of measurement times. As a result, the time required for optimizing the device parameters can be shortened.

As described above, in the mass spectrometry method and the mass spectrometer of the first to seventh aspects, device parameters with high detection sensitivity can be searched for by avoiding reaching a local optimum solution. However, the number of measurement times required for optimizing the parameters is not reduced only by changing the order of optimization of the parameters. As described above, it is necessary to optimize the parameters for each target component or for each condition of the mobile phase. Therefore, for example, when the number of target components is large, the number of measurement times considerably increases even in the sequential method. Therefore, such a situation demands a method that can achieve detection sensitivity equivalent to in the conventional method with a smaller number of measurement times than in the conventional sequential method.

An object of a mass spectrometry method and a mass spectrometer of the following aspect is to be capable of searching for a parameter with high detection sensitivity with a smaller number of measurement times than in the conventional exhaustive method and sequential method, thereby improving the measurement efficiency and reducing the amount of samples and consumption materials used.

That is, a mass spectrometry method of one aspect is a mass spectrometry method using a mass spectrometer having an ion source using an atmospheric pressure ionization method for ionizing a component contained in a liquid sample including, to optimize N parameters that affect ionization efficiency in the ion source, N being an integer of 2 or more:
- a measurement execution step of repeatedly executing measurement on a sample containing a target component while sequentially changing values of a set of M parameters including all or some of parameters in which at least one type of physical quantities are identical among the N parameters, M being 1 or more and less than N, and values of other N-M parameters in a plurality of stages; and
- a parameter value search step of sequentially finding an optimum value set of the M parameters and of the N-M parameters based on a measurement result in the measurement execution step.

A mass spectrometer of one aspect is a mass spectrometer including an ion source using an atmospheric pressure ionization method for ionizing a component contained in a liquid sample, a mass separator for separating ions derived from a sample component in accordance with a mass-to-charge ratio, and a detector for detecting the separated ions, the mass spectrometer including, to optimize N parameters that affect ionization efficiency in the ion source, N being an integer of 2 or more:
- a measurement controller configured to cause the ion source, the mass separator, and the detector to repeatedly execute measurement on a sample containing a target component while changing values of a set of M parameters including all or some of parameters in which at least one physical quantities are identical among the N parameters, M being 1 or more and less than N, and values of other N-M parameters in a plurality of stages; and
- a parameter determiner configured to sequentially find an optimum value set of the M parameters and of the N-M parameters based on a result of the measurement executed under control of the measurement controller.

The physical quantities referred to herein are temperature, voltage, gas flow rate, and the like, as described above. In particular, the detection sensitivity is greatly affected by temperature, and a plurality of temperature conditions have high correlation. Therefore, a parameter set may be formed by arranging all or some of parameters whose physical quantities are temperature. As a result, the condition of high detection sensitivity can be found with a small number of measurement times, and the time required for optimizing the device parameters can be shortened.

REFERENCE SIGNS LIST

1 . . . Measurement Unit
2 . . . Liquid Chromatograph Unit (LC Unit)
3 . . . Mass Spectrometry Unit (MS Unit)
31 . . . Ion Source
310 . . . Chamber
311 . . . Ionization Chamber
312 . . . ESI Probe
3121 . . . Capillary
3122 . . . Nebulizing Gas Tube
3123 . . . Heating Gas Tube
3124 . . . Interface Heater
3125 . . . High-Voltage Power Source
313 . . . Desolvation Tube
314 . . . Dry Gas Tube
315 . . . Desolvation Tube Heater
316 . . . Block Heater
32 . . . Mass Separator
33 . . . Detector
4 . . . Controller
41 . . . Device Parameter Optimization-Time Measurement Controller
42 . . . Device Parameter Storage Unit
43 . . . Measurement Controller
5 . . . Data Processor
51 . . . Data Storage Unit
52 . . . Peak Detector
53 . . . Device Parameter Determiner

The invention claimed is:

1. A mass spectrometry method using a mass spectrometer including an ion source using an atmospheric pressure ionization method for ionizing a component contained in a liquid sample, the method comprising, to optimize N parameters that affect ionization efficiency in the ion source, N being an integer of 2 or more:
- a measurement execution step of repeatedly executing measurement on a sample containing a target component while changing a value of each of the N parameters or a value set of M parameters among the N parameters in a plurality of stages, M being an integer smaller than N; and
- a parameter value search step of sequentially finding an optimum value of each of the N parameters or an optimum value set of the M parameters based on a measurement result in the measurement execution step, wherein
- in the measurement execution step, a value of at least one parameter whose physical quantity is temperature among the N parameters or a value set of the M parameters including the at least one parameter is changed prior to all parameters whose physical quantities are other than temperature among the N parameters, and
- in the parameter value search step, the at least one parameter whose physical quantity is temperature is optimized prior to all the parameters whose physical quantities are other than temperature.

2. The mass spectrometry Method according to claim 1, wherein among the N parameters, all the parameters whose physical quantities are temperature are optimized prior to all the parameters whose physical quantities are other than temperature.

3. The mass spectrometry method according to claim 1, wherein the N parameters include parameters whose physical quantities are temperature, voltage, and gas flow rate.

4. The mass spectrometry method according to claim 1, wherein in the measurement execution step, the value of the parameter whose physical quantity is temperature is monotonously changed within a predetermined range when the value is changed.

5. The mass spectrometry method according to claim 4, wherein in the measurement execution step, the value of the parameter whose physical quantity is temperature is monotonically increased when the value is changed.

6. The mass spectrometry method according to claim 1, wherein two or more parameters whose physical quantities are temperature are collectively optimized as a parameter set.

7. The mass spectrometry method according to claim 6, wherein all the parameters whose physical quantities are temperature among the N parameters are arranged as a parameter set.

8. A mass spectrometer comprising:
an ion source using an atmospheric pressure ionization method for ionizing a component contained in a liquid sample;
a mass separator configured to separate ions derived from the component contained in the liquid sample in accordance with a mass-to-charge ratio;
a detector configured to detect the separated ions;
to optimize N parameters that affect ionization efficiency in the ion source, N being an integer of 2 or more,
a measurement controller configured to cause the ion source, the mass separator, and the detector to repeatedly execute measurement on a sample containing a target component while changing a value of each of the N parameters or a value set of M parameters among the N parameters in a plurality of stages, M being an integer smaller than N; and
a parameter determiner configured to sequentially find an optimum value of each of the N parameters or an optimum value set of the M parameters based on a result of the measurement executed under control of the measurement controller, wherein
the measurement controller causes measurement to be repeatedly executed while changing a value of at least one parameter whose physical quantity is temperature among the N parameters or a value set of the M parameters including the at least one parameter prior to all parameters whose physical quantities are other than temperature among the N parameters, and
the parameter determiner optimizes the at least one parameter whose physical quantity is temperature prior to all the parameters whose physical quantities are other than temperature.

* * * * *